US011181369B2

(12) United States Patent
Adler et al.

(10) Patent No.: US 11,181,369 B2
(45) Date of Patent: Nov. 23, 2021

(54) FRAMEWORKS AND METHODOLOGIES CONFIGURED TO ENABLE REAL-TIME LOCATION-SPECIFIC DETERMINATION OF RECREATIONALLY RELEVANT WAVE CHARACTERISTIC DATA, INCLUDING GENERATION AND DELIVERY OF LOCATION-SPECIFIC OCEAN WAVE NOTIFICATIONS

(71) Applicant: SURF SENSE DEVICES PTY LTD, New South Wales (AU)

(72) Inventors: Nathan Adler, New South Wales (AU); Sam Cassisi, New South Wales (AU)

(*) Notice: Subject to any disclaimer, the term of this patent is extended or adjusted under 35 U.S.C. 154(b) by 131 days.

(21) Appl. No.: 16/327,467

(22) PCT Filed: Aug. 22, 2017

(86) PCT No.: PCT/AU2017/050888
§ 371 (c)(1),
(2) Date: Feb. 22, 2019

(87) PCT Pub. No.: WO2018/035559
PCT Pub. Date: Mar. 1, 2018

(65) Prior Publication Data
US 2019/0204080 A1     Jul. 4, 2019

(30) Foreign Application Priority Data

Aug. 22, 2016   (AU) .................................. 2016903317
Aug. 22, 2016   (AU) .................................. 2016903319
(Continued)

(51) Int. Cl.
*G01C 13/00* (2006.01)
*B63B 22/00* (2006.01)
(Continued)

(52) U.S. Cl.
CPC ............ *G01C 13/002* (2013.01); *B63B 22/00* (2013.01); *G01C 13/00* (2013.01); *G01S 19/42* (2013.01);
(Continued)

(58) Field of Classification Search
CPC ....... G01C 13/00; G01C 13/002; G01S 19/42; G08B 21/02; B63B 22/00; B63B 2022/006; B63B 2211/02
See application file for complete search history.

(56) References Cited

U.S. PATENT DOCUMENTS 6,954,175 B1 * 10/2005 Cox ......................... G01S 19/41
                                                             342/357.31
8,306,673 B1    11/2012 Manning
(Continued)

FOREIGN PATENT DOCUMENTS

WO           2015120046 A1    8/2015

OTHER PUBLICATIONS

International Search Report for PCT/AU2017/050888 completed on Nov. 21, 2017, 7 pages.
(Continued)

*Primary Examiner* — David J Bolduc
(74) *Attorney, Agent, or Firm* — Brooks Kushman P.C.

(57) ABSTRACT

The present invention relates to the generation of electronic notifications relating to ocean waves. Embodiments include frameworks and methodologies configured to enable real-time location-specific determination of recreationally relevant wave characteristic data, including (bot not limited to) generation and delivery of location-specific ocean wave notifications. Embodiments include, by way of example, technology for providing real-time location-specific determination of recreationally relevant wave characteristic data, portable and/or wearable devices configured to deliver noti-
(Continued)

fications in respect of approaching waves, wave monitoring devices and frameworks configured to enable generation of alert notifications for surfers, rock fishers and other recreational users, and generation and delivery of location-specific ocean wave data, including visual data for event broadcasts.

14 Claims, 8 Drawing Sheets

(30) Foreign Application Priority Data

| Aug. 22, 2016 | (AU) | 2016903321 |
|---|---|---|
| Aug. 22, 2016 | (AU) | 2016903327 |
| Mar. 9, 2017 | (AU) | 2017900828 |

(51) Int. Cl.
  *G01S 19/42* (2010.01)
  *G08B 21/02* (2006.01)

(52) U.S. Cl.
  CPC ........ *G08B 21/02* (2013.01); *B63B 2022/006* (2013.01); *B63B 2211/02* (2013.01)

(56) References Cited

U.S. PATENT DOCUMENTS

| 8,423,487 | B1 | 4/2013 | Rubin |
| 9,014,983 | B1 | 4/2015 | Uy |
| 9,020,538 | B1 | 4/2015 | White et al. |
| 2005/0001762 | A1* | 1/2005 | Han .................. G01S 19/44 342/357.59 |
| 2008/0262666 | A1 | 10/2008 | Manning |
| 2010/0259269 | A1* | 10/2010 | Cho .................. G01V 3/15 324/365 |
| 2013/0033598 | A1* | 2/2013 | Milnes .................. H04N 7/185 348/144 |
| 2014/0253376 | A1* | 9/2014 | Large .................. G01S 19/39 342/357.59 |
| 2015/0025804 | A1 | 1/2015 | Jones et al. |
| 2016/0136482 | A1 | 5/2016 | Askew, Jr. et al. |
| 2017/0038214 | A1* | 2/2017 | Benel .................. G01S 19/05 |
| 2018/0041561 | A1* | 2/2018 | Davies .................. H04L 65/602 |
| 2018/0091981 | A1* | 3/2018 | Sharma .................. G08G 1/0112 |
| 2018/0239031 | A1* | 8/2018 | San Miguel .......... G01S 19/45 |
| 2018/0352027 | A1* | 12/2018 | Sharma ............ G08G 1/096816 |

OTHER PUBLICATIONS

Written Opinion of the International Searching Authority for PCT/AU2017/050888 completed on Nov. 21, 2017, 9 pages.

* cited by examiner

FRAMEWORKS AND METHODOLOGIES CONFIGURED TO ENABLE REAL-TIME LOCATION-SPECIFIC DETERMINATION OF RECREATIONALLY RELEVANT WAVE CHARACTERISTIC DATA, INCLUDING GENERATION AND DELIVERY OF LOCATION-SPECIFIC OCEAN WAVE NOTIFICATIONS

CROSS-REFERENCE TO RELATED APPLICATION

This application is the U.S. national phase of PCT Application No. PCT/AU2017/050888 filed on Aug. 22, 2017, which claims priority to AU Patent Application No. 2016903317 filed on Aug. 22, 2016, AU Patent Application No. 2016903319 filed on Aug. 22, 2016, AU Patent Application No. 2016903321 filed on Aug. 22, 2016, AU Patent Application No. 2016903327 filed on Aug. 22, 2016, and AU Patent Application No. 2017900828 filed on Mar. 9, 2017, the disclosures of which are incorporated in their entirety by reference herein.

FIELD OF THE INVENTION

The present invention relates to the generation of electronic notifications relating to ocean waves. Embodiments include frameworks and methodologies configured to enable real-time location-specific determination of recreationally relevant wave characteristic data, including (but not limited to) generation and delivery of location-specific ocean wave notifications. Embodiments include, by way of example, technology for providing real-time location-specific determination of recreationally relevant wave characteristic data, portable and/or wearable devices configured to deliver notifications in respect of approaching waves, wave monitoring devices and frameworks configured to enable generation of alert notifications for surfers, rock fishers and other recreational users, and generation and delivery of location-specific ocean wave data, including visual data for event broadcasts. While some embodiments will be described herein with particular reference to those applications, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Ocean waves are influenced by a large number of factors, and are volatile and unpredictable, varying greatly in size. Even in good weather conditions, ocean recreationalists, such as surfers, rock fishers and boaters crossing sandbars are repeatedly caught off-guard and unaware of an incoming large wave.

The pursuit of surfing is beholden to the unpredictability of ocean waves. Generally speaking, the larger the wave is, the further out it breaks. "Sets" of waves may appear randomly and at sparse intervals, that can leave surfers out of position and not able to catch the best quality waves that pass through.

As of 2016, studies reveal that there are on average 284 drowning deaths in Australia per year, of which approximately 40% were in coastal waters. The pursuit of rock fishing is especially hazardous due to the nature of ocean waves, with participants often being washed into the ocean by unanticipated waves. This in many instances results in death, with over 130 deaths from rock fishing in Australia over the past 10 years. Unpredictability of the ocean also has a significant bearing on a range of other activities, for example including surfing.

SUMMARY OF THE INVENTION

It is an object of the present invention to overcome or ameliorate at least one of the disadvantages of the prior art, or to provide a useful alternative.

One embodiment provides computer-implemented method for causing a user device to provide a notification, the method including:

accessing input data derived from one or more sensors, wherein the one or more sensors are configured to provide data representative of wave activity in a body of water, wherein the one or more sensors include sensors provided on one or more buoys located in a wave approach region for a notification zone;

processing the input data thereby to determine wave activity parameter data for one or more waves approaching a notification zone;

based on the wave activity parameter data, determining attributes of individual waves; and providing output data configured to enable a user of a networked device to view data representative of the attributes of the one or more waves.

One embodiment provides a method wherein the networked device includes a wearable device configured to provide a surfer (for example a stand up surfer or bodyboard surfer) with real-time information regarding approaching waves.

One embodiment provides a method wherein the networked device includes a computer system configured to provide, for a live surf event broadcast, real-time information regarding approaching waves.

One embodiment provides a method wherein the wherein the notification zone includes a surf break.

One embodiment provides a method wherein the one or more sensors provided on one or more buoys include a GPS sensor and an IMU provided on a common buoy unit.

One embodiment provides a method wherein GPS data and IMU data is fused together thereby to determine wave activity parameter data for one or more waves approaching a notification zone.

One embodiment provides a method wherein attributes are provided for each individual wave.

One embodiment provides a method wherein attributes are provided for sets defined by a periodically arriving groupings of relatively larger waves.

One embodiment provides a method wherein attributes are provided for each individual wave and for sets defined by a periodically arriving groupings of relatively larger waves.

One embodiment provides a computer-implemented method for causing a user device to provide a notification, the method including:

accessing input data derived from one or more sensors, wherein the one or more sensors are configured to provide data representative of wave activity in a body of water;

processing the input data thereby to determine wave activity parameter data for one or more waves approaching a notification zone;

based on the wave activity parameter data, determining that one or more waves approaching the notification zone have predefined attributes; and based on the determining that one or more waves approaching the notification zone have predefined attributes, providing output data configured to cause a portable user device in the notification zone to provide a notification representative of the identifying of the threshold deviation.

One embodiment provides a computer-implemented method for causing a user device to provide a notification, the method including:

accessing input data derived from one or more sensors, wherein the one or more sensors are configured to provide data representative of wave activity in a body of water;

processing the input data thereby to determine wave activity parameter data for one or more waves approaching a notification zone;

providing output data configured to cause a device in the notification zone to provide a notification representative of the wave activity parameter data.

One embodiment provides a computer-implemented method for analysing wave data, the method including:

receiving input data representative of objectively measured wave characteristics for a given location, wherein the objectively measured wave characteristics include a plurality of wave attribute data elements;

receiving input data representative of identified wave characteristics for the given location;

time-reconciling the data representative of objectively measured wave characteristics with the input data representative of visually identified wave characteristics;

tuning a wave prediction algorithm which includes variables corresponding to the wave attribute data elements, thereby to apply weightings to one or more of the wave attribute data elements such that an output of the wave prediction algorithm more closely reflects the visually identified wave characteristics;

thereby to define a location-tuned wave prediction algorithm.

One embodiment provides a portable electronic device including a communications module that is configured to receive data representative of approaching ocean wave activity; and an output device that is configured to provide a notification in the case that approaching ocean wave activity has predefined attributes.

One embodiment provides a system configured to enabling analysing of wave data, the method including:

one or more sensors that are configured to provide data representative of wave activity in a body of water;

a processing unit that is configured to: (i) process the input data thereby to determine wave activity parameter data for one or more waves approaching a notification zone; and (ii) based on the wave activity parameter data, determining that one or more waves approaching the notification zone have predefined attributes; and a notification component, the notification delivery component being configured to, based on the determining that one or more waves approaching the notification zone have predefined attributes, provide output data configured to cause a portable user device in the notification zone to provide a notification representative of the identifying of the threshold deviation.

One embodiment provides a system for enabling embedding of wave data into a media stream, the system including:

one or more wave sensing devices, wherein the one or more wave sensing devices are deployed on buoys located in a wave approach zone of a competition area, wherein the one or more wave sensing devices are configured to record data representative of wave activity and transmit that data wirelessly to a processing device;

a processing device that is configured to receive the data representative of wave activity, and process that data thereby to provide visually renderable data that is configured to be embedded in a media stream.

One embodiment provides a computer program product for performing a method as described herein.

One embodiment provides a non-transitory carrier medium for carrying computer executable code that, when executed on a processor, causes the processor to perform a method as described herein.

One embodiment provides a system configured for performing a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which.

DETAILED DESCRIPTION

The present invention relates, at least in some embodiments, to the generation of real time and post-processed information and electronic notifications relating to general wave conditions in a localised area as well as specific wave events. Embodiments have been developed primarily to provide location-specific wave information relevant to recreation and occupations around areas with wave activity, such as surfing and rock fishing.

In some embodiments, a framework is configured to enable analysis of local wave information (for example utilising one or more sensors mounted to a buoy or buoys), thereby to make determinations/predictions in relation to waves approaching a notification zone. For example, this includes determinations/predictions in relation to wave characteristics. Preferably this includes processing wave data to determine whether sensed data is representative of an approaching wave or waves that have characteristics of greater than threshold deviation from a defined baseline. This is optionally implemented in the context of separating approaching "set wave activity" from "inter-set wave activity. In this way, notifications can be triggered in response to identification of an oncoming set, thereby to warn one or more users in the notification zone. As described below, users are notified via respective portable devices, which preferably include wearable devices. Some embodiments make use of the likes of mobile apps which received notifications via the Internet (and/or local networks), the apps executing on a range of wearable and other forms of devices.

In a simple example use case, wearable devices are configured to connect to a local wireless network, thereby to initiate communications with other one or more other network devices which are configured to provide location-specific wave notifications derived from processing of wave sensor data. The notifications provided include notifications representative of approaching waves. This is optionally a rudimentary notification, for example an alert (e.g. visual, audible and/or haptic) which, in layman's terms, indicates "big waves approaching", and may also include more detailed information about the relative size of a wave as a "rating", and time to arrival. This is useful in a range of situations, including (but not limited to): alerting a rock fisherman to pay particular attention to the ocean and avoid a dangerous wave; assisting a surfer in getting into position for set waves; and alerting surf broadcasters (and other parties involved with competitive surfing) of upcoming potential scoring opportunities.

Example Frameworks

Figure 1A:
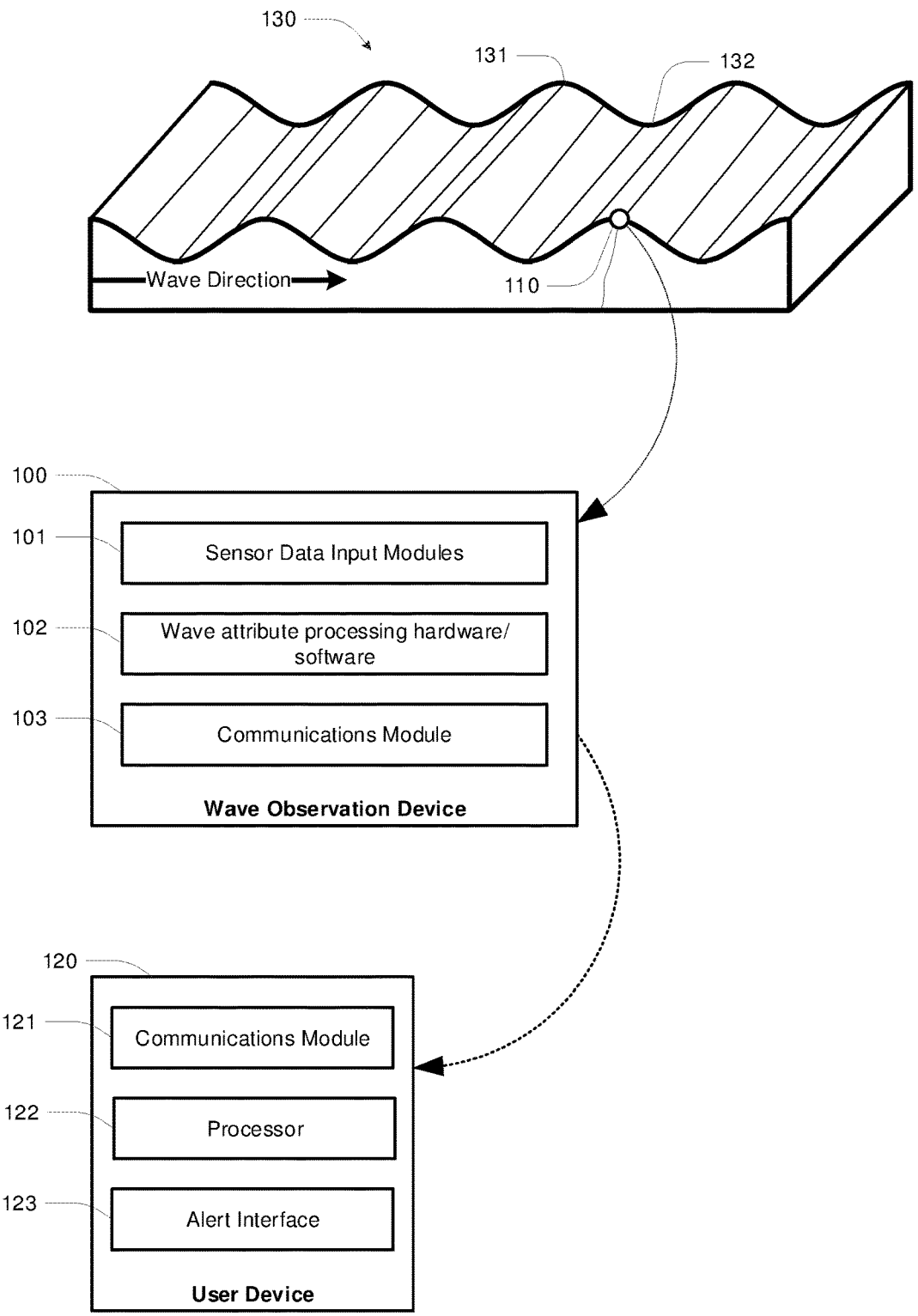
FIG. 1A illustrates a framework according to one embodiment.

FIG. 1A illustrates a framework according to one embodiment. This framework centres upon a wave observation device 100. This wave observation device is either integrated with an ocean-located device 110 (such as a buoy), or provided by land-based computing infrastructure which is configured to receive input data from one or more ocean located devices (such as device 110). In the case of the latter, communication between device 100 and device 110 are optionally configured to communicate over a range of communication mediums, such as radio communication, WiFi, and the like. In any case, device 110 provides to device 100 input data derived from one or more sensors, wherein the one or more sensors are configured to provide data representative of wave activity in a body of water.

Although embodiments described herein focus on ocean-located devices, such as buoys, to provide data representative of wave activity, further embodiments make use of alternate wave monitoring sensors, optionally including laser, sonar, and other techniques. Furthermore, although FIG. 1A illustrates a single device 110, in some embodiments there are multiple connected devices in the form of device 101.

Wave observation device 101 includes sensor input module 101, which are configured for accessing input data derived from one or more sensors, wherein the one or more sensors are configured to provide data representative of wave activity in a body of water. Wave attribute processing hardware and software (for example a processor configured to execute software instructions maintained on a memory module) is configured for processing the input data thereby to determine wave activity parameter data for one or more waves approaching a notification zone. The nature of wave activity parameter data and manner of processing varies between embodiments, and examples are provided further below. Based on the wave activity parameter data, componentry 102 is configured for determining that one or more waves approaching the notification zone have predefined attributes (for example based on relative size, speed, period, direction, and the like).

A communications module 103 is configured to provide output based on wave attribute processing. For example, based on the determining that one or more waves approaching the notification zone have predefined attributes, output data is provided in a manner configured to cause a portable user device in the notification zone to provide a notification representative of the identifying of the threshold deviation. The notification may include, in some embodiments: a sound, a vibration, a signal via a LED indicator, or a digital display read out.

In the example of FIG. 1A, the output is provided (directly or indirectly) to a user device 120, which includes a communications module 121. The manner by which communications modules 103 and 121 interact varies between embodiments. Examples include:

Utilisation of a wireless networking protocol, such as WiFi, such that devices 100 and 120 connect to a common wireless network. This may be a wireless network provided by way of one or more land-based routers and/or one or more buoy-based routers.

Utilisation of radio wave communication by either or both of devices 100 and 120. For example, wave/notification information may be embedded into a radio signal outputted by device, and/or embedded into a radio signal received by device 120. In some embodiments an intermediary device perform a radio/WiFi conversion role, for example where one of devices 100 and 120 connects to a WiFi network and the other relies on more rudimentary radio communication.

More generally, communication may occur over a mobile network, providing data through the internet or another accessible platform to smart, internet-connected devices through a mobile application or website. Information may also be transmitted directly from the buoy itself, to other devices, optionally in the form of light or sound based upon activity at the wave detector.

Device 122 includes a processor 122 which is configured to determine a manner of function for an alert interface 123 in response to the received data. The nature of function and alert interface varies between embodiments, and examples are provided further below.

Figure 1B:
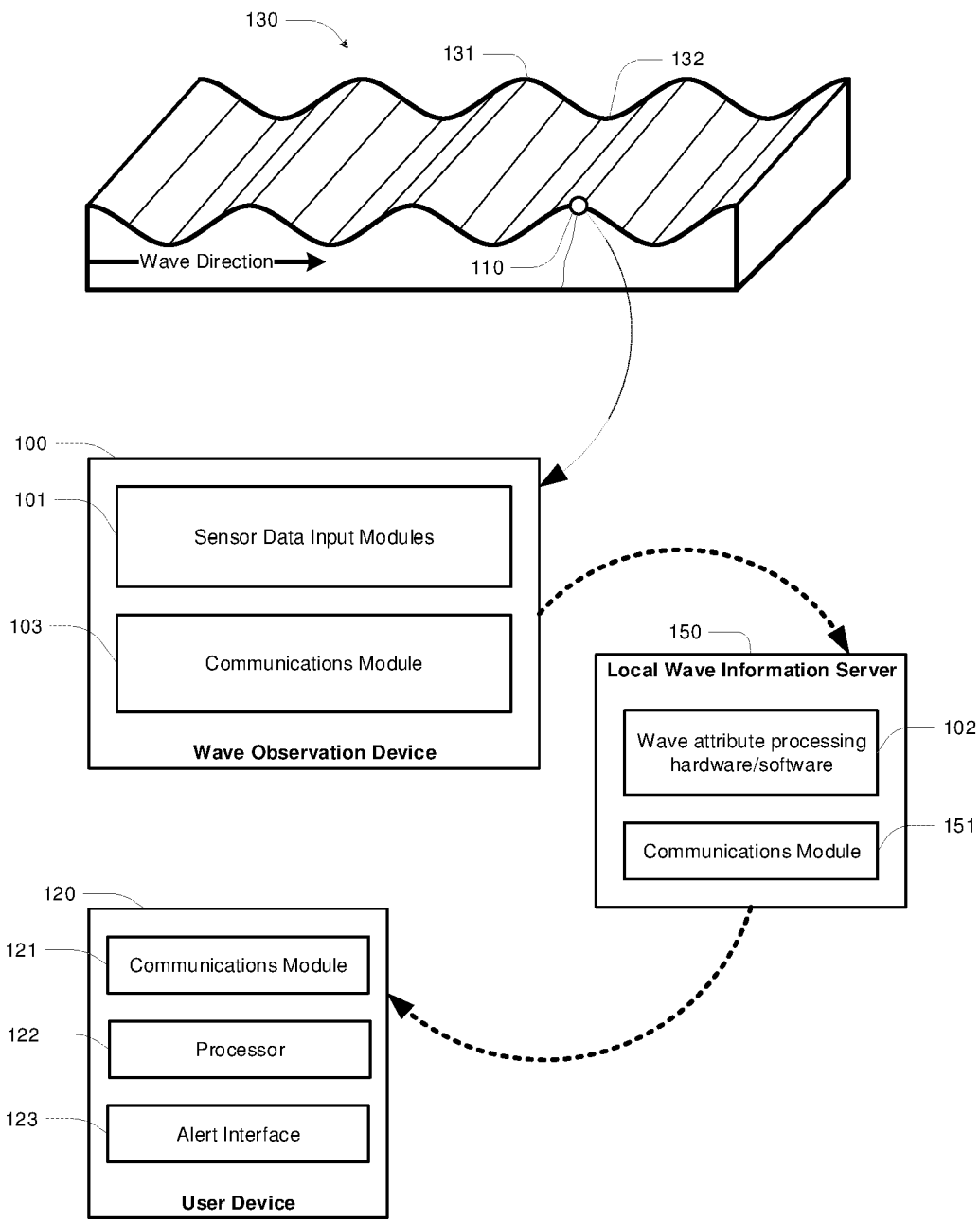
FIG. 1B illustrates a framework according to one embodiment.

FIG. 1B illustrates a variation of the framework of FIG. 1A. In this example, wave observation device 100 is integrated with ocean-located device 110, and wave attribute processing hardware/software 102 is provided on land via a local wave information server 150 (which includes a communications module 151).

Figure 1C:
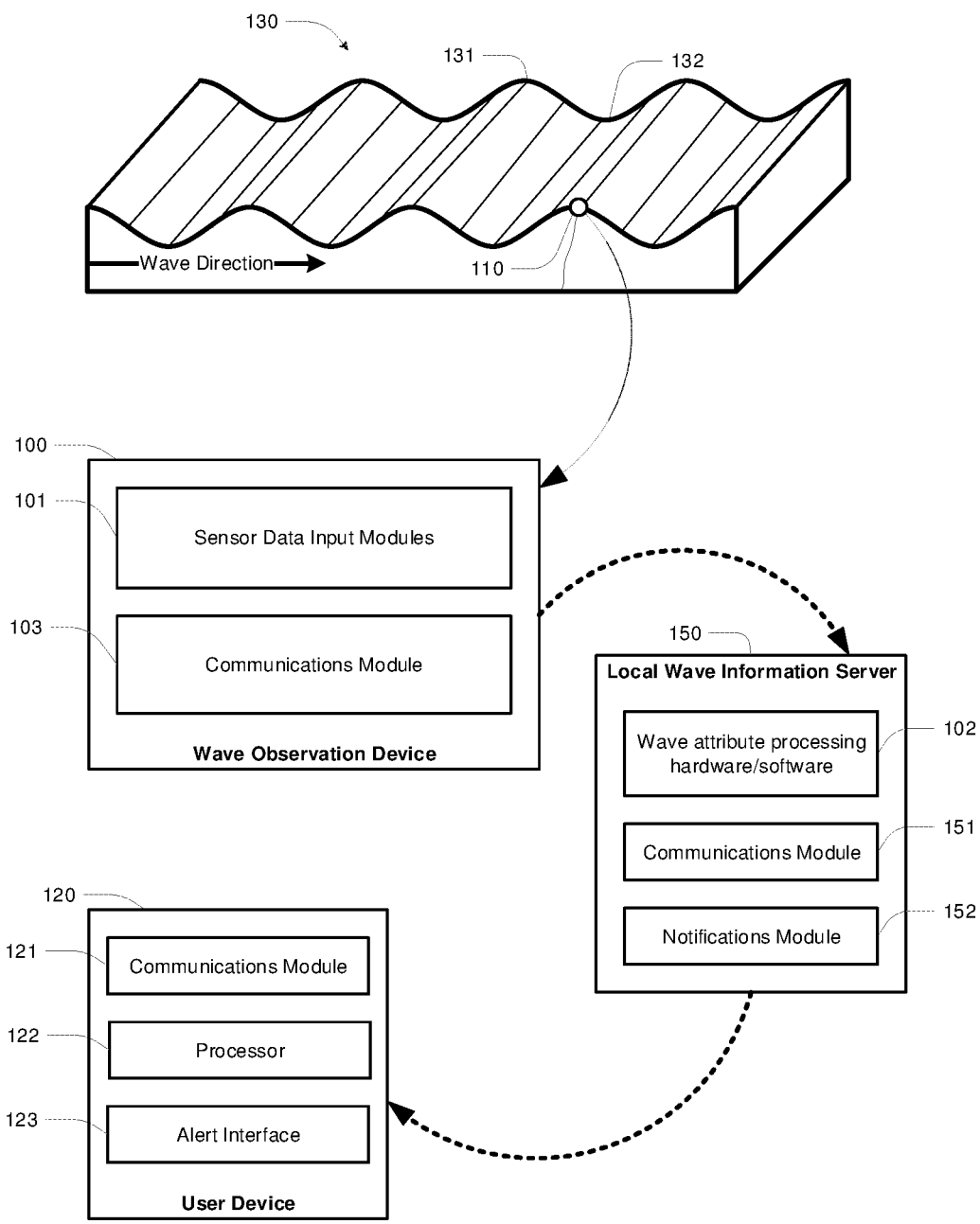
FIG. 1C illustrates a framework according to one embodiment.

A further variation is provided in FIG. 1C, in which local wave information server 150 includes a notifications module 152. Notifications module 152 is configured to deliver tailored notifications to a plurality of individual user devices such as device 120. For example, each device 120 includes a position locating module (for example to allow locating technology such as Real-Time Kinematic GPS, GPS, A-GPS, WiFi/cellular/BLE triangulation, and so on). It should be noted that it is known to equip wave monitoring buoys with Real-Time Kinematic GPS positioning, thereby to enable Centimetre level ocean surface monitoring. Each user device 120 registers with server 150, and server 150 maintains real-time (or close to real-time) data representative of each device's respective position. In this manner, server 150 is able to determine relevance of wave parameter information and/or notifications for each device 120, and tailor outputted data. By way of example, factors such as wave speed, wave direction, and distance between a user device and a wave measurement location are able to be used as inputs when defining user-device location tailored notifications.

The nature of portable device 120 varies between embodiments. Examples include: existing networked devices, such as smartphones and the like; wearable technology such as smartwatches; and other devices that are able to receive data and in response provide notifications in a visual, audible and/or haptic form.

Example Wave Parameter Processing Methods

As noted, technology described herein is configured to access input data derived from one or more sensors, wherein the one or more sensors are configured to provide data representative of wave activity in a body of water. The data representative of wave activity in a body of water include data representative of: wave direction; wave speed; and wave height. This is optionally measured by way of one or more accelerometers, which record the movement of a floating buoy, and hence allow determination of wave parameters.

In some embodiments, buoy sensor hardware includes a combination of one or more of: accelerometers, gyroscopes, compass modules, and one or more GPS receivers with advanced position solution methods for example Real-Time Kinematic GPS positioning). The data from all these sensors is preferably be fused together to provide centimetre-level accuracy on both the horizontal and vertical motion of the buoy in the water. This provides a highly accurate surface-water waveform of the ocean wave.

Figure 2A:
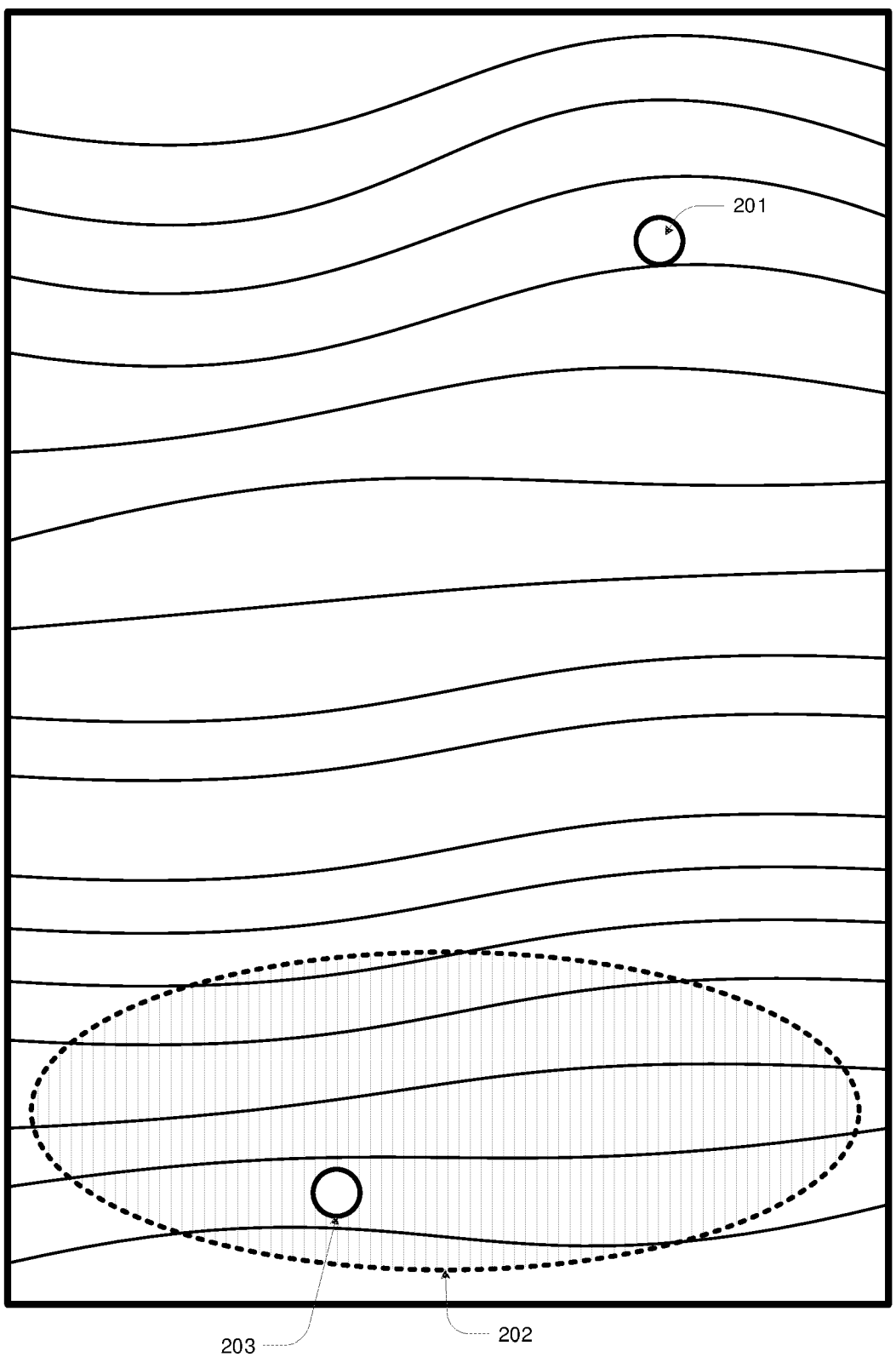
FIG. 2A and FIG. 2B schematically illustrate example usage environments.

In overview, the input data is processed thereby to determine wave activity parameter data for one or more waves approaching a notification zone. For example, as shown in FIG. 2A, a wave sensor buoy 201 provides input data, and this is processed for the purposes of determining notifications for a notification zone 202. A user device 203 is located within the notification zone. Although the notification zone is shown as being an oval, that is not intended to be limiting. For example, such is the nature of wave movement, the notification zone may be of a trapezoidal, irregular, or even arbitrary shape. In some embodiments multiple notification zones are defined, and respective notification data defined for each of those (and notifications are delivered to a user device 203 dependant on a notification zone in which that device is located).

In a preferred embodiment, wave parameters that are measured include
  absolute height of a wave;
  peak-to-trough height;
  steepness of the wave on both the front and back faces;
  width and/or volume of the wave;
  horizontal displacement of water through the wave; and
  speed of the wave;
  a descriptor or value representative of an overall shape (or anticipated breaking shape) of a wave;
  Other qualitative and/or quantitative characteristics.

These parameters are also preferably correlated with data that is be specific for each beach or other coastal activity spot, to determine what wave is of most concern (or interest) to users such as surfers, rock fishers and boaters. For example, waves of particular interest for surfers at a barrelling reef break might have different characteristics to waves of particular interest at a given beach break. Additionally, characteristics waves of concern to rock fishers may vary depending on the nature of a particular spot. In some cases an initial configuration phase is implemented whereby a human observer records visually observed wave characteristics over a sample period, and uses that to assist in understanding of wave data collected during that sample period. The calibration process may also include deploying a secondary sensing device closer to the surf-break location for data validation.

Figure 2B:
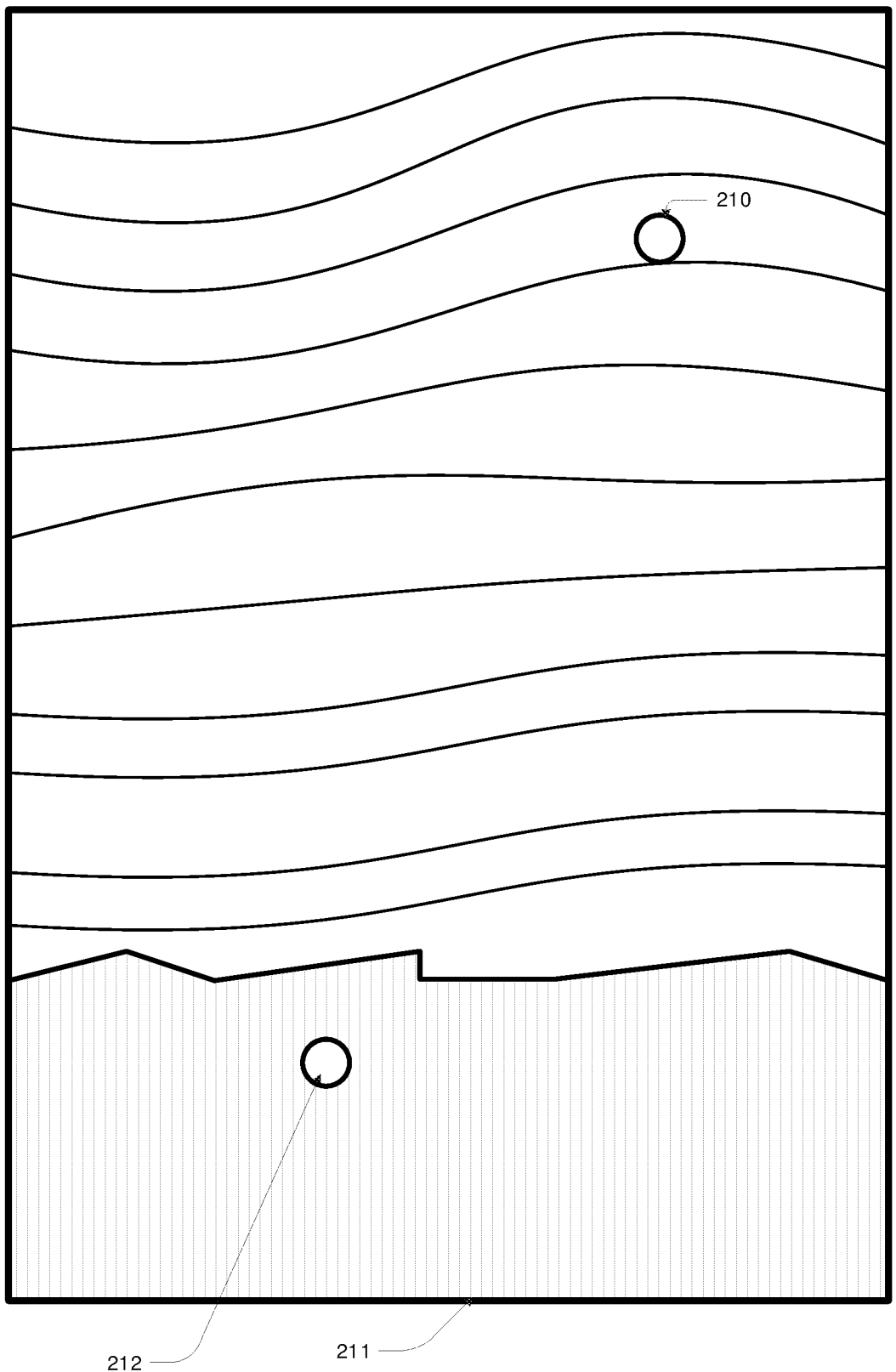

The example of FIG. 2A is intended to represent a surfing line-up, where a user is located in the water. The example of FIG. 2B, on the other hand, is representative of a rock-fishing environment, where a buoy 210 is offshore of a notification zone in the form of a rock-shelf 211 on which a user 212 is located. It will be appreciated that, whilst the notification zone is practically defined as a rock-shelf (having an irregular shape), notifications are in effect defined based an approximation of the rock shelf's edge relative to device buoy 210.

The speed of the wave is correlated, among other things, to the size of the wave and the depth of the water. Normal ocean waves may have a speed range of 5-10 m/s. Based on mathematical models and experimental data from a specific location, the time for a wave to reach the user is readily determined.

To provide the user with enough notice, the buoy is in some embodiments located in a position that gives the user from a nominal range of 20 seconds up to 60 seconds of warning. For a normal case of 30 seconds of warning with waves travelling at 7.5 m/s, this would have the buoy ideally 30×7.5=225 m away from the surfing "line-up", rock shelf, other location where the waves break, or other location of interest.

As noted, wave data derived from sensors on a buoy such as buoy 201 or 210 is processed to derive wave activity parameter data, and determine whether one or more waves approaching the notification zone have predefined attributes. The predefined attributes preferably include wave size parameters (for example based on one or more of amplitude, wavelength and period) of greater than a threshold deviation from a historical baseline. The historical baseline is preferably defined over a weighed period. For example:

Wave activity over a first preceding period (for example a most recent 20 minutes) is applied a first weighting.

Wave activity over a second preceding period is applied a lower second weighting (for example a most recent hour, or an hour preceding the most recent 20 minutes).

Wave activity over a third preceding period (for example spanning several hours) is applied a still lower third weighting.

A preferred embodiment applies a continuous calibration and weighting depending on the most recent 1-2 hours of data, calibrated with known tidal data.

Preferably, the historical baseline is representative of non-set wave activity over a historical period. In that regard, the term "set wave activity" is used to describe wave activity representing close temporal proximity waves within a first approximate size range, and "non-set wave activity" is used to describe remainder background wave activity. That is, over a period of time $T_0$ to $T_n$, there will be one or more set wave time periods of $T_i$ to $T_j$ which include one or a group of waves in a first size range, and two or more time periods outside of the time periods $T_i$ to $T_j$ representing waves in a second (smaller) size range. This allows for determination of the following aspects of information:

Observation that one or more set waves are approaching a notification area.

Comparison of approaching set waves with preceding set waves (for example bigger/smaller than last set, bigger/smaller than average over past hour, etc).

A count of the number of waves in an approaching set.

A prediction of which wave in a set is the largest.

In some embodiments, inter-set periods are measured and analysis, thereby to provide data representative of regularity of sets, which is optionally used to provide prediction of timing for a yet-to-be-observed set.

The output data is preferably configured to cause a portable user device in the notification zone to provide a notification representative one or more approaching set waves (for example limited to the fact that a set is approaching, and/or set attributes such as those noted in the bullet points above).

Example Hardware and Operation

Embodiments include buoy hardware. One example embodiment makes use of real-time RTK GPS for buoy positioning, involving a live base-station feed as well as on-board RTK-capable GPS unit. This optionally includes an unconventional implementation of RTK technology whereby multi-kilobit (>10 kbps) low-latency live data streaming is provided, which is not available on conventional buoy systems. This is configured to provide absolute spatial information for the buoy (rather than relative motion, used by conventional wave buoys), and this allows for forms of wave interpretation which are adapted to provide a form of accuracy and interpretability suited to the present purposes (which are focussed on attributes of individual waves and sets for recreational purposes, where detailed/special wave attributes are of importance). For example, the buoy is equally capable of low and high frequency measurements, unlike frequency-filtered calculations used by other systems; multi-kilobit (>10 kbps) low-latency live data streaming provides for sub-cm position calculations in three dimensions in real time.

An example embodiment is additionally configured to merge of GPS and IMU (inertial measurement unit) data (using GPS components described above, and on on-board IMU). Preferably, GPS data is accumulated at rate of 2 Hz, IMU data is captured at rate of 10 Hz or 20 Hz, and the data is fused using a Kalman filter. Combination of GPS and IMU sensors provides for improved accuracy, reduced errors, and redundancy. This is able to be achieved via a low-cost IMU system in combination with GPS enhanced by live-streaming and off-board processing.

Example Wave "Quality" Determination

In some embodiments, a "quality focussed" wave analysis approach is employed, this being a fundamentally different way of measuring wave events compared with conventional wave buoys (for example those used for meteorological purposes). Determining whether a wave or a set is going to be perfect to surf, how it is going to break, whether it poses a risk to rock-fishers, could cause erosion etc, must consider an entirely different set of wave factors other than just "wave height". For example, a "gentle hill" of a wave, although it may be tall, will behave entirely differently than a steep, short wave pulse that pulls a lot of water into the wave as it breaks.

Embodiments of the technology disclosed herein include technology configured to measure multiple elements of an ocean swell that determine wave qualities including:

Front face height (trough to peak, $\Delta h1$)

Back face height (peak to trough, $\Delta h2$)

Time from trough to peak ($\Delta t1$) and peak to trough ($\Delta t2$)

Steepness of the wave ($\Delta h1/\Delta t1$), ($\Delta h2/\Delta t2$)

Horizontal displacement of surface water leading in to the wave (pull, $\Delta x1$) and over the top of the wave (push, $\Delta x2$)

Regularity/smoothness of the overall shape of the wave

Absolute levels of the ocean before (Ht1), during (HP) and after (Ht2) the wave, to determine how much water has been drained into the wave and ocean depth, which determines where the wave breaks Estimate for the travelling speed of the wave A metric of the "quality" of the wave mathematically derived from polynomial combination of some or all of these factors. For example, in one example a wave factor "K" is determined as follows:

$$K = a\Delta h_1 + b\Delta h_2 + c\frac{\Delta h_1}{\Delta t_1} + d\frac{\Delta h_2}{\Delta t_2} + e\Delta x_1 + f\Delta x_2$$

In this equation, a, b, c, d, e and f are empirical and/or derived constants from wave mathematics and beach calibration. It should be appreciated that this is an example only.

Calculations are preferably conducted on a wave-by-wave basis (rather than summed across a large data set) to allow for individual wave interpretations, allowing for insights into waves. This is used in the context of example applications described herein, for example web-based notifications, wearable device notifications, and in the context of live broadcast event coverage.

Example Use Cases

A number of example use cases are described below. It will be appreciated that various features described in respect of these use cases are interchangeable thereby to define further embodiments. That is, each use case provides an illustrative combination of features that are able to be applied across a range of embodiments.

Example Use Case 1: Rock Fishing

A sensor-equipped buoy is installed approximately 150 m offshore from a known popular rock fishing location. The buoy is solar powered, and configured to continuously monitor wave activity, and periodically transmit a beacon signal representative of wave activity upon exception conditions being met (for example upon observation of incoming set waves, or waves of greater then threshold size increase differential from preceding waves). A user device, in the form of a wristband (or, in further examples, any internet-connect smart device), is configured to receive the beacon signal, and provide a warning indicator visually and with sound. A large wave triggers the warning, which gives the rock fisher enough notice to clear the area and avoid the possibility of being swept off the rocks by a large wave.

Example Use Case 2: Recreational Surfing

A sensor-equipped buoy is installed approximately 250 m offshore from a known popular surfing location. The buoy is solar powered, and configured to continuously monitor wave activity, and periodically transmit a beacon signal representative of wave activity upon exception conditions being met (for example upon observation of incoming set waves, or waves of greater then threshold size increase differential from preceding waves). The beacon signal is received by a shore-based processing unit (for example a personal computer housed in a secure location). The shore-based processing unit provides a local wireless network (for example WiFi or Class 1 Bluetooth), which enables communication with one or more users' waterproof wearable devices (for example a wristband configured to provide visual/audible and/or haptic feedback). The shore-based processing unit provides wave notifications, for example representing approaching set waves and/or characteristics of approaching sets. Optionally, users register with different account privileges (for example based on the nature of their devices, or subscription fees) to receive information with differing levels of detail.

Example Use Case 3: Performance Surfing

A user releases a battery powered sensor unit mounted to a buoy in a location approximately 150 m offshore from a surfing location. The sensor unit provides a WiFi or Bluetooth network to which the user connects via a wearable device. The user receives real-time updates and statistics regarding wave activity, including wave direction and size.

Example Use Case 4: Professional Surfing

A user releases a battery powered sensor unit mounted to a buoy in a location approximately 350 m offshore from a surfing location. The sensor unit provides a WiFi or Bluetooth network, enabling delivery of real-time wave notifications to a computing system. This enables a commentary team of a broadcast surfing event to receive wave analytics, for example to enable prediction of upcoming scoring wave activity and/or perform detailed analytics on waves that were surfed by competitors.

Example Method—Deviation Reporting

Figure 3A:
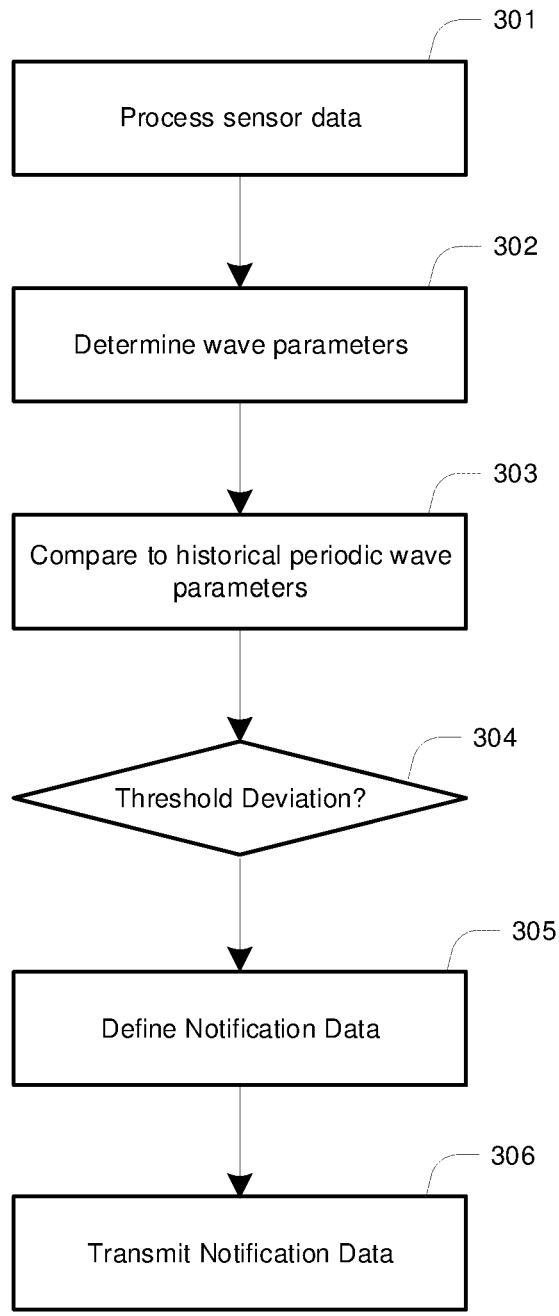
FIG. 3A illustrates a method according to one embodiment.

FIG. 3A illustrates a method according to one embodiment. This method is performed based on execution of computer executable code (software instructions) by one or more computing devices. For example, the method may be performed by a networked device that is configured to both (i) receive sensor data representative of wave activity; and (ii) provide notifications to a user device.

Sensor data representative of wave activity is received at 301. As noted above, this may include (or be derived from) data including the following characteristics:
 absolute height of a wave;
 peak-to-trough height;
 steepness of the wave on both the front and back faces;
 width and/or volume of the wave;
 horizontal displacement of water through the wave; and
 speed of the wave.

Wave parameters are then determined at 302. The wave parameters may include the characteristics above, or one or more derived values that are calculated based upon the characteristics above. For example, in some embodiments sample wave data is analysis, for instance by reference to visually derived sample data, thereby to tune wave analysis algorithms to account for particular locations (including accounting for tidal variances and the like). This allows for location-specific measures of wave parameters that are relevant to particular activities (such as a wave parameter that is relevant to the propensity of a wave to be of concern to a rock fisher).

Block 303 represents comparing current wave parameters to historical wave parameters, thereby to determine (at 304) whether the current wave parameters present greater than a threshold deviation thereby to warrant the defining and delivery (see 305 and 306) of notification data. For example: the threshold deviation may be configured to report on: (i) identified set wave activity; (ii) a wave of greater than threshold increase in a size/power parameter compared with a preceding 20 minute average (or other preceding period); (iii) a wave of greater than threshold increase in a size/power parameter compared with a preceding "n" waves (for example with "n" between 2 and 10). In some embodiments the comparison may also include a comparison with calibrated data predefined with respect to a particular beach. For example, wave observations during an calibration analysis period are calibrated using secondary sensors and/or visual observations, and that calibration data is used to assist in analysis of wave data during a subsequent period.

In some embodiments, a method may also involve "ranking" the wave based on a scale determined by the conditions of the day and previous waves, to produce a percentile that the wave occupies for its size and strength with respect to other waves. This is optionally combined with an estimation for how often it is likely that this wave occurs. For example, it may be determined that this is a wave that occurs with a certain regularity, such as "once every 10 minutes", "once every half an hour", "once every two hours" etc, or on the other hand, a wave being estimated as "in the top 5%" of waves for a particular day. This information may be provided to the end user through the notification to assist them in making a judgement about the wave (and/or strategic positioning in a line-up). For "set" wave activity, each wave in the set may be analysed an comparative information on the size of each of the waves in the set may also be reported to the user.

Advantageously, a user of such technology is provided with useful objective wave data for an approaching wave, potentially even before that wave is able to be visually observed. So as to provide a practical example, at some surf breaks there are multiple take-off locations, and these differ in terms of how they handle waves of varying direction and size. A user is hence able to adjust his/her position at the surf break with advance warning of oncoming wave characteristics, thereby to maximise opportunity of being in the correct take-off position for a sensed oncoming wave.

The defining and transmission of notification data varies between embodiments based on implementation determinations. For example, in some embodiments a threshold deviation simply leads to a signal that causes a generic alert (e.g. haptic, visual and/or audible) at a user device (such as a wearable device), whereas in other embodiments the notification includes additional details such as predicted wave characteristics, comparison to wave characteristics over a preceding period (for instance to indicate bigger sets from smaller sets), and so on.

Example Method—Location-Specific Tuning and Reporting

Figure 3B:
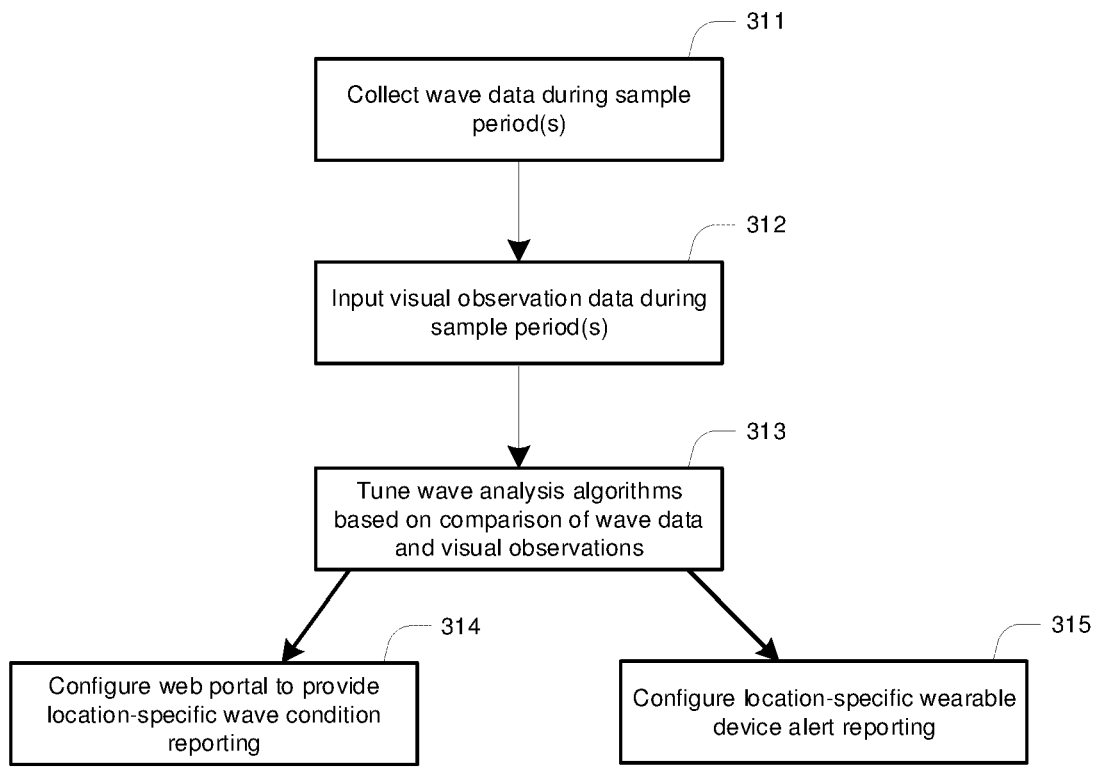
FIG. 3B illustrates a method according to one embodiment.

FIG. 3B illustrates a method according to one embodiment. This method is also performed based on execution of computer executable code (software instructions) by one or more computing devices. For example, the method may be performed by a networked device that is configured to both (i) receive sensor data representative of wave activity; and (ii) provide notifications to a user device.

The method of FIG. 3B relates to location-specific tuning and reporting on wave data. Functional block 310 represents collection of wave data during one or more sample periods, using wave sensing hardware such as is described above (e.g. wave buoys and the like). As noted above, this may include (or be derived from) data including the following characteristics:

- absolute height of a wave;
- peak-to-trough height;
- steepness of the wave on both the front and back faces;
- width and/or volume of the wave;
- horizontal displacement of water through the wave; and speed of the wave;
- a descriptor or value representative of an overall shape (or anticipated breaking shape) of a wave;
- Other qualitative and/or quantitative characteristics.

Functional block 313 represents inputting of visual observation data for the same sample periods. For example, a human user observes waves during the sample periods, and records time specific visual observations (such as estimated observed wave height, wave character from a surfing standpoint, and so on). Preferably the sample periods are representative of different external influencing conditions, such as: (i) tide height; (ii) tide direction; (iii) tide rate of change; (iv) wind direction. It will be appreciated that the greater the granularity in sample periods, the more effective the overall process becomes. The calibration process may also include deploying a secondary sensing device closer to the surf-break location for data validation.

Based on comparison of the wave data and visual observations, wave analysis algorithms are able to be tuned in a location (and/or condition) specific manner, thereby to enable accuracy-optimised wave reporting. This is optionally used for either or both of the following purposes:

Configuring a web portal to provide accurate location-specific wave condition reporting (block 315). This may include factors such as wave type (e.g. crumbling or barrelling), set wave frequency, set wave average height (surfing height), and other factors relevant to surfing or another activity. It will be appreciated that various aspects of the technology described herein may be applied in the context of general surf conditions reporting, as opposed to purely being applied to point-in-time approaching wave notifications.

Configuring location-specific personal device (e.g. wearable or smartphone) point-in-time approaching wave notifications, for example as described further above.

Tuning of wave prediction algorithms based on a comparison of experimental (e.g. visual) data enables an improved location specific understanding of how measurable wave attributes affect practical (recreationally relevant) wave attributes at a particular spot. That is, whilst raw wave data may be identical, the algorithms used to provide meaningful recreational wave information will vary between locations, for example because of how a particular reef or sandbar causes waves to break. This is preferably accounted for by initially generating a standardised wave prediction algorithm (e.g. using measurable wave characteristics noted above), and applying parameterised weighting to those characteristics in the algorithm. For example, it may be found that steepness of the front face of a wave has a significant effect on the height of a breaking wave at Spot A, but no significant effect on the height of a breaking wave at Spot B (where, for example, speed of the wave is a more important factor).

Application to Broadcast of Surfing Events

As noted above, in some embodiments technology described herein is applied in the context of professional surfing, which optionally includes surfing events (such as competitions) that are broadcast (for example live broadcast, including online streaming).

As noted above, in one example implementation in the context of competitive surfing includes deploying a battery powered sensor unit mounted to a buoy in a location offshore from a surfing location (for example about 350 m in the case of a beach break; the precise location may vary depending on wave mechanics of a particular competition venue). The sensor unit provides a WiFi or Bluetooth network, enabling delivery of real-time wave notifications to a computing system. This enables a commentary team of a broadcast surfing event to receive wave analytics, for example to enable prediction of upcoming scoring wave activity and/or perform detailed analytics on waves that were surfed by competitors.

Figure 1D:
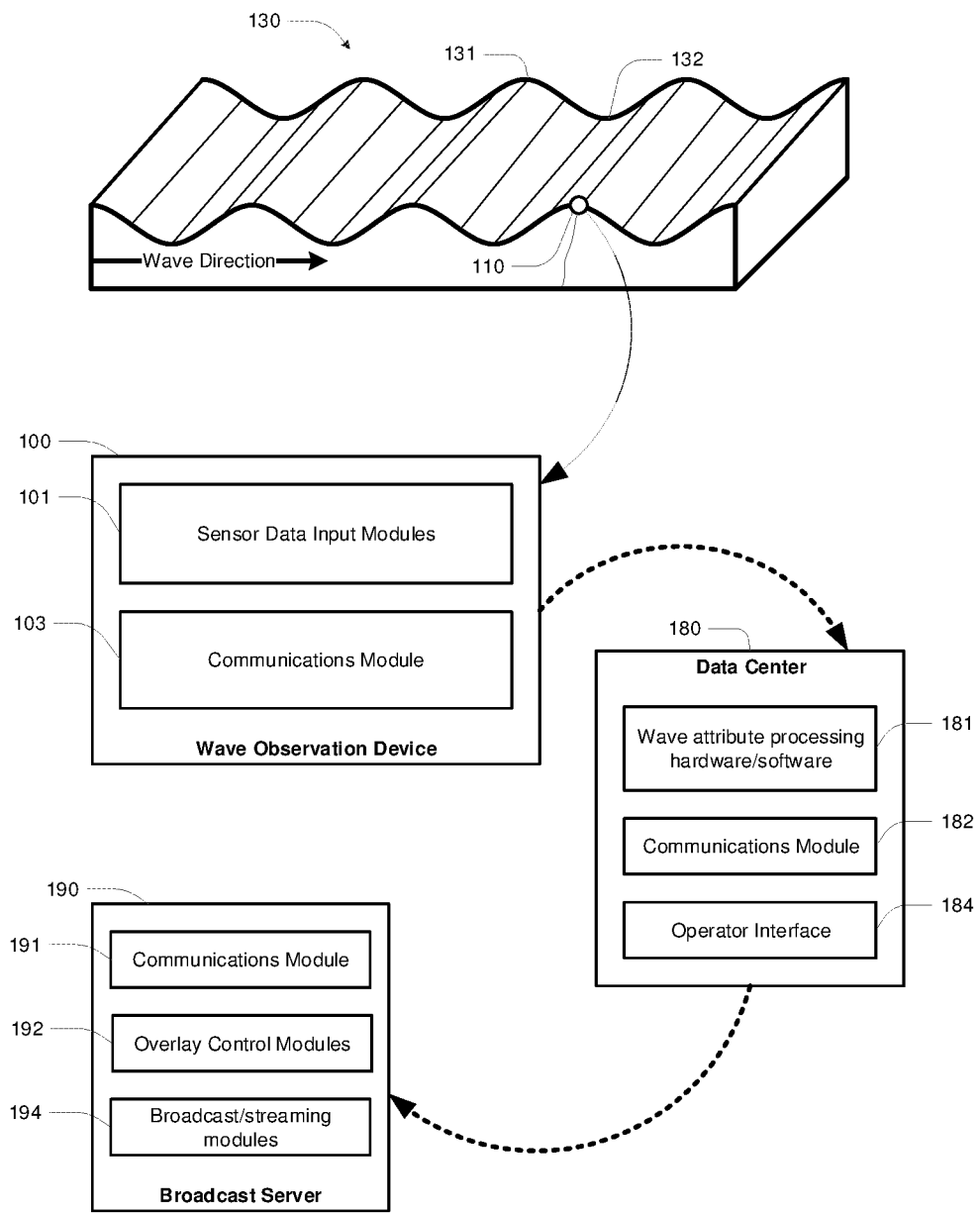
FIG. 1D illustrates a framework according to one embodiment.

In the example of FIG. 1D, data from a wave observation device 100 is streamed in real time to a data centre 180, which includes one or more computing terminals. Data centre 180 includes wave attribute processing hardware/software 181. This is configured to receive wave attribute data from device 100, and analyses that data (for example as described above). This optionally includes making wave attribute predictions (such as height/power/etc) for waves that are approaching a competition area, providing metrics for waves that have been surfed by competitors, and providing historical data (for example recorded observations regarding delays between sets, biggest waves, patterns in inter-set wave sizes, set characteristics, wave directions, and so on). The manner by which hardware/software 181 is configured is preferably tailored for particular locations, based on known wave mechanics for those locations. For example, an algorithm is in some embodiments configured to monitor for waves having particular size characteristics and particular direction characteristics.

Data centre 180 is configured to process the wave data, and transform that data into data representative of presentable information to be displayed (for example overlayed) on a televised/streamed broadcast. In the example of FIG. 1D, an operator interface is provided thereby to enable manual modification/control/tuning of this data. For example, an operator is provided with instructions to generate a particular form of wave analysis, and provides that in an on-demand capacity.

Data centre 180 is in communications with a broadcast server 190 via communications modules 182 and 191. Displayable data generated by data centre 180 (including overlays, animations, and the like) is then able to be embedded into broadcast data (for example by way of an overlay) by way of overlay control modules 192, with the broadcast data being outputted via broadcast/streaming modules 194.

By way of example, the visual information provided by data centre 180 and output via server 190 may include:

- Wave forms of imminently incoming waves, as accurately measured by the sensing device.
- Wave statistics, such as wave heights, in the time leading up to a competition round.
- Notifications on incoming set activity that is of interest to surf commentators and the viewing public.
- Statistics on any particular surfer's chosen waves and resulting scores (for example the size/attributes of each wave a surfer caught, correlation between the size/attributes of a wave caught and the score given, and/or probabilities of any particular surfer winning a heat based on catching waves of a particular size).

Waves that surfers ride during a competition are matched to waves measured by the sensing device, by knowing the speed of the wave, distance from the buoy to the break and the time the wave was caught by the surfer.

It will be appreciated that, in this manner, data provided by sensing device 100 allows for in depth wave metric analysis for waves surfed (and scored) during a competition, in addition to predictive commentary regarding approaching waves (sensed), likelihood of approaching waves (based on historical data), and/or attributes of a wave required to reach a particular score (based on historical wave metric vs. score comparisons).

CONCLUSIONS AND INTERPRETATION

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. Input devices may also include audio/video input devices, and/or devices configured to derive information relating to characteristics/attributes of a human user. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A computer-implemented method for causing a user device to provide a notification, the method including:
   accessing input data derived from one or more sensors, wherein the one or more sensors are configured to provide data representative of wave activity in a body of water, wherein the one or more sensors include sensors provided on one or more buoys located in a wave approach region for a notification zone;
   processing the input data thereby to determine wave activity parameter data for one or more waves approaching a notification zone;

based on the wave activity parameter data, determining attributes of individual waves; and providing output data configured to enable a user of a networked device to view data representative of the attributes of the one or more waves;

wherein the input data includes, for each of the one or more buoys, multi-kilobit live-streamed GPS data that provides absolute spatial information for the buoy.

2. The method according to claim 1 wherein processing the input data includes processing of the GPS data thereby to determine wave activity parameter data for one or more waves approaching a notification zone.

3. The method according to claim 1 wherein the networked device is configured to render a display that representative of individual wave attributes and an estimated time to arrival of those individual waves at a physical location.

4. The method according to claim 1 wherein the networked device includes a wearable device configured to provide a surfer with real-time information regarding approaching waves.

5. The method according to claim 1 wherein the networked device includes a computer system configured to provide real-time information regarding approaching waves.

6. The method according to claim 1 wherein the attributes are provided for each individual wave.

7. The method according to claim 1 wherein the attributes are provided for each individual wave and for sets defined by a periodically arriving groupings of relatively larger waves.

8. The method according to claim 1 wherein the attributes for individual waves are determined via processing of centimetre-accurate GPS data that is live streamed via a wireless network.

9. The method according to claim 1 wherein the one or more sensors include a sensor device that is configured to real-time RTK GPS thereby to determine centimetre-accurate buoy positioning, and deliver that data wirelessly via multi-kilobit low-latency live data streaming.

10. The method according to claim 1 wherein the data representative of wave activity in a body of water includes data representative of one or more of the following: wave direction; wave speed; wave height; wave period; and a prediction on the overall size and quality of the breaking wave.

11. A method according to claim 1 the processing device performs processing of the GPS data thereby to determine wave activity parameter data for one or more waves approaching a notification zone.

12. A wave monitoring device including:

a buoy body configured to float in a body of water;

a GPS unit carried by the buoy body;

a communications module that is configured to transmit wirelessly to a processing device GPS data that provides absolute spatial information for the buoy, wherein the processing device is configured to perform processing of the GPS data thereby to determine wave activity parameter data for one or more waves approaching a notification zone;

wherein the wireless transmission of GPS data is multi-kilobit live-streamed centimetre-accurate GPS data.

13. The wave monitoring device according to claim 12 wherein the GPS unit is a RTK-capable GPS unit.

14. The wave monitoring device according to claim 12 wherein the processing device is configured to determine wave attributes for each of a plurality of waves approaching a location defined relative to the buoy body.

* * * * *